United States Patent [19]
Klein

[11] Patent Number: 5,310,234
[45] Date of Patent: May 10, 1994

[54] VEHICLE MESSAGE BOX

[76] Inventor: David Klein, 190 Ross St., Apt. 1A, Brooklyn, N.Y. 11211

[21] Appl. No.: 118,518

[22] Filed: Sep. 9, 1993

[51] Int. Cl.$^5$ .............................................. B60R 5/00
[52] U.S. Cl. ................................ 296/37.7; 296/37.8; 224/42.42; 224/42.43; 224/311
[58] Field of Search ............................ 296/37.7, 37.8; 224/309, 310, 311, 42.42, 315, 317, 42.43, 42.44; 180/89.11

[56] References Cited

U.S. PATENT DOCUMENTS

| | | | |
|---|---|---|---|
| 1,622,240 | 3/1927 | Stahl | 296/37.7 |
| 1,762,640 | 6/1930 | Sanford | 296/37.7 X |
| 3,773,378 | 11/1973 | Lewis | 296/37.7 |
| 5,213,243 | 5/1993 | Landon | 296/37.8 X |

FOREIGN PATENT DOCUMENTS 592933 2/1960 Canada ............................ 296/37.7

Primary Examiner—Joseph D. Pape
Attorney, Agent, or Firm—Michael I. Kroll

[57] ABSTRACT

A message box is provided for a motor vehicle having a small rectangular side aperture located near the drivers seat. A side door is in the side aperture of the roof. The side door has a narrow slot to allow messages and mail to be deposited therethrough. A receptacle is mounted to the underside of the roof within the motor vehicle about the drivers seat and adjacent the side door, so as to receive the message and mail deposited through the narrow slot in the side door. A structure is in the receptacle for retrieving the messages and mail deposited therein.

10 Claims, 2 Drawing Sheets

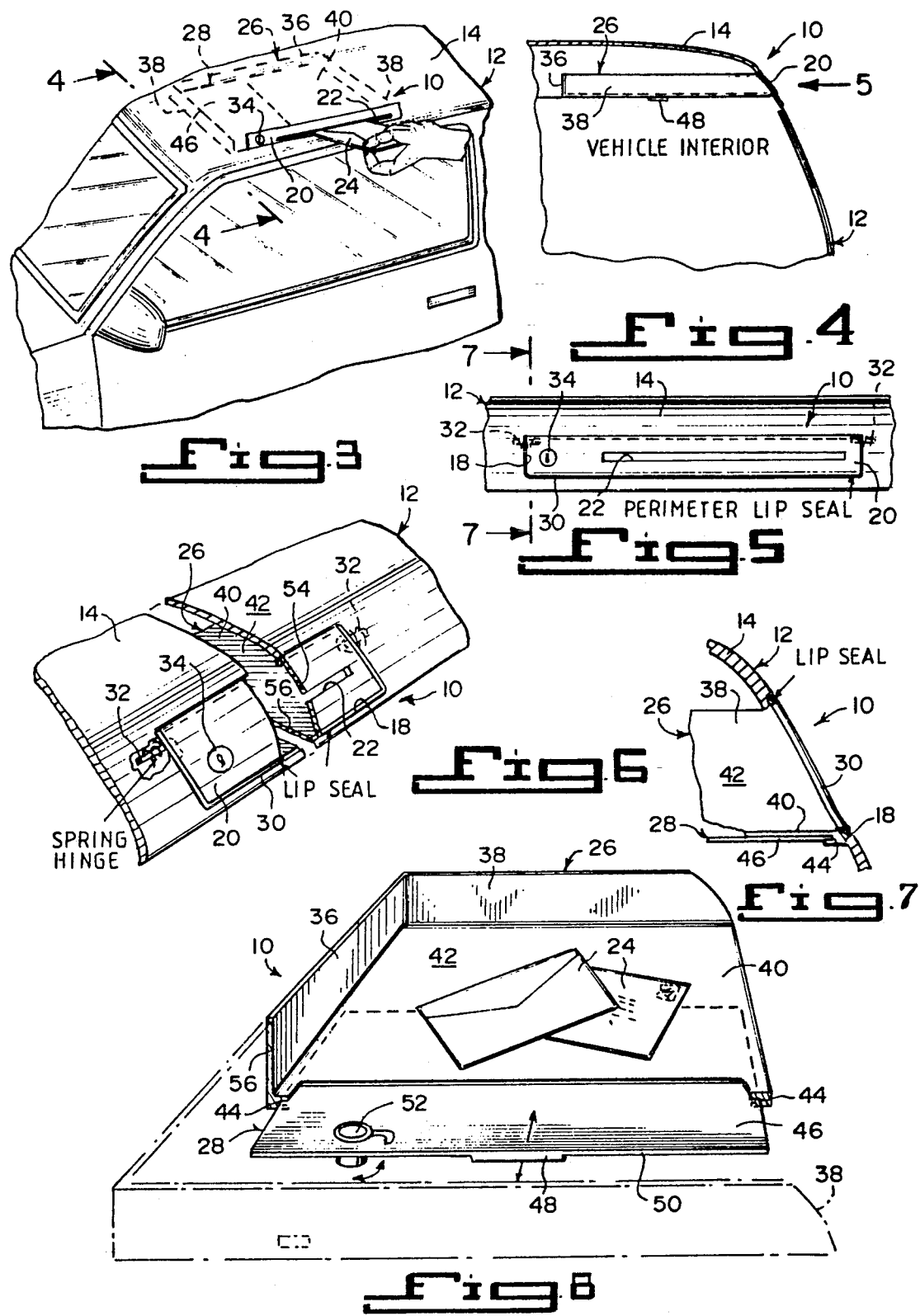

VEHICLE MESSAGE BOX

BACKGROUND OF THE INVENTION

1. Field of the Invention

The instant invention relates generally to mail drops and more specifically it relates to a vehicle message box.

2. Description of the Prior Art

Numerous mail drops have been provided in prior art that are private receptacles or slots used for the delivery of incoming mail. While these units may be suitable for the particular purpose to which they address, they would not be as suitable for the purposes of the present invention as heretofore described.

SUMMARY OF THE INVENTION

A primary object of the present invention is to provide a vehicle message box that will overcome the shortcomings of the prior art devices.

Another object is to provide a vehicle message box that is built into a roof of any motor vehicle, such as an automobile or a truck, so that messages and mail can be delivered to a person when that person is not at the motor vehicle.

An additional object is to provide a vehicle message box that contains a lock on the inside and a lock on the outside, to prevent unauthorized entry into the message box from the interior and exterior of the motor vehicle.

A further object is to provide a vehicle message box that is simple and easy to use.

A still further object is to provide a vehicle message box that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 3 is a perspective view of a portion of the motor vehicle showing a message or letter being inserted into the slot in the door of the instant invention.

FIG. 4 is a diagrammatic cross sectional view taken along line 4—4 in FIG. 3.

FIG. 5 is a side view taken in the direction of arrow 5 in FIG. 4.

FIG. 6 is a perspective view of a portion of the roof of the motor vehicle with parts broken away, showing the instant invention built therein.

FIG. 7 is a diagrammatic cross sectional view taken along line 7—7 in FIG. 5, with the door removed showing the lip seal thereabout.

FIG. 8 is an end perspective view with parts broken away and in phantom of just the receptacle portion, showing the sliding tray with lock mechanism in greater detail.

DETAILED DESCRIPTION OF THE PREFERRED EMBODIMENTS

Figure 1:
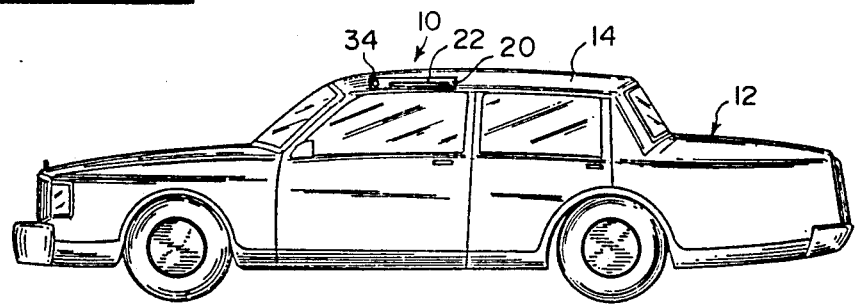
FIG. 1 is a side view of a motor vehicle with the instant invention built into the roof.
Figure 2:
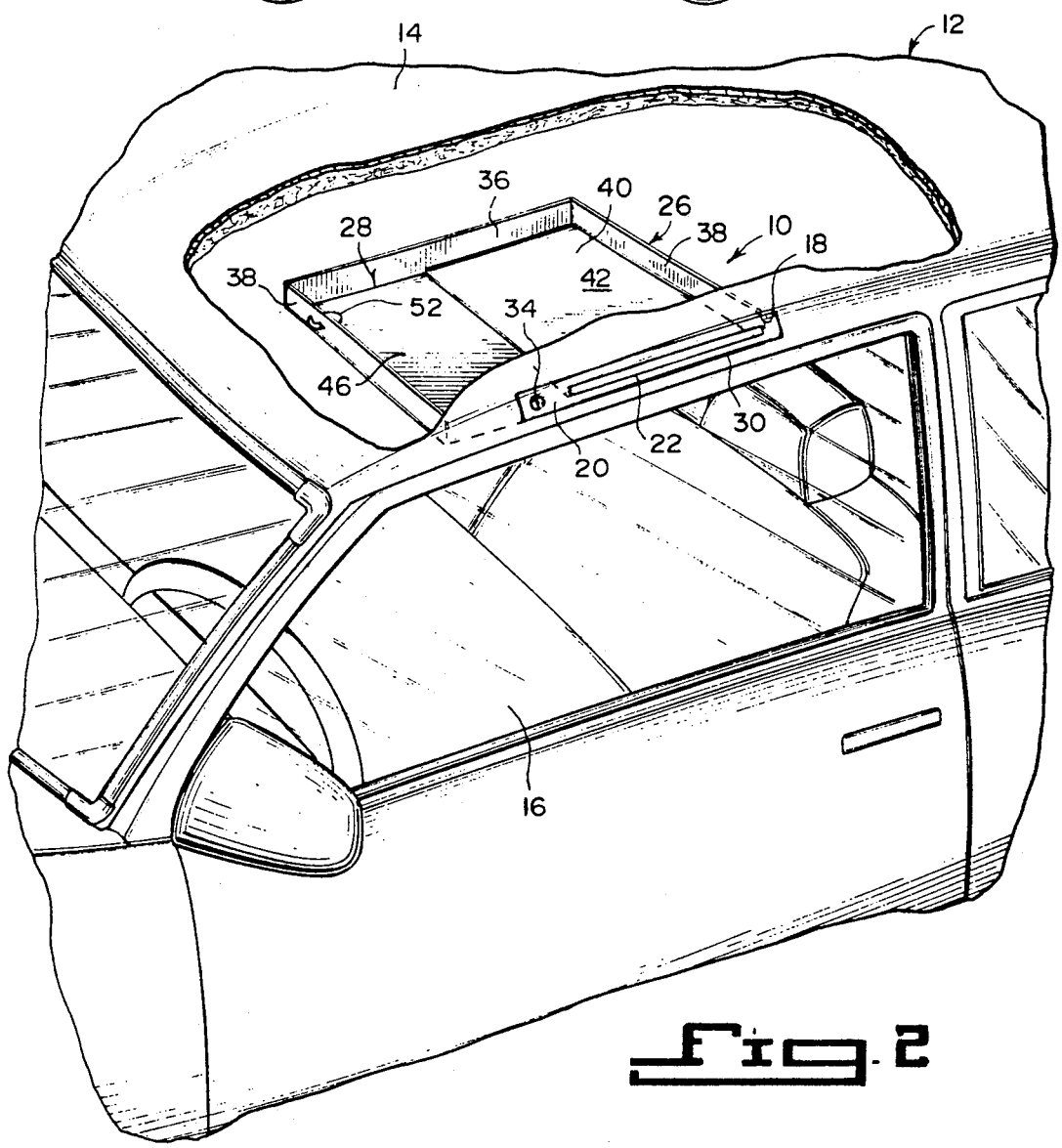
FIG. 2 is a enlarged perspective view of a portion of the motor vehicle with parts broken away, showing an end view of the instant invention in greater detail therein.

Turning now descriptively to the drawings, in which similar reference characters denote similar elements throughout the several views, FIGS. 1 through 8 illustrate a message box 10 for a motor vehicle 12, having a roof 14 and a drivers seat 16, which consists of the roof 14 having a small rectangular side aperture 18 located near the drivers seat 16. A side door 20 is in the side aperture 18 of the roof 14. The side door 20 has a narrow slot 22 to allow messages and mail 24 to be deposited therethrough. A receptacle 26 is mounted to the underside of the roof 14 within the motor vehicle 12 above the drivers seat 16 and adjacent the side door 20, so as to receive the messages and mail 24 deposited through the narrow slot 22 in the side door 20. A structure 28 is in the receptacle 26 for retrieving the messages and mail 24 deposited therein.

A lip seal 30 is about the perimeter of the side aperture 18, to prevent water from entering past the side door 20 and into the receptacle 26, so as to keep said receptacle 26 waterproof.

The side door 20 contains a pair of spring hinges 32, each located on an opposite side and adjacent a top edge between the side door 20 and the side aperture 18 in the roof 14. The side door 20 can be lifted up to gain access into the receptacle 26 from the exterior of the motor vehicle 12. The side door 20 includes a key operated lock 34, to prevent unauthorized entry into the receptacle 26 from the exterior of the motor vehicle 12.

The receptacle 26 consists of a rear side wall 36 and a pair of end walls 38. A bottom shelf 40 extends about halfway the length of the rear side wall 36 behind the slot 22 in the side door 20, so as to form a compartment 42 to receive the messages and mail 24 deposited through the slot 22.

The retrieving structure 28 contains a track assembly 44 integrally formed under opposite sides of the bottom shelf 40 and extends longitudinally between the end walls 38 of the receptacle 26. A slide tray 46 fits between the track assembly 44 below the bottom shelf 40. The side tray 46 can ride within the track assembly 44 and be opened to retrieve the messages and mail 24 deposited onto the bottom shelf 40 within the motor vehicle 12.

A finger grip 48 extends downwardly from a free end 50 of the slide tray 46. A person sitting in the drivers seat 16 in the motor vehicle 12 can hold the finger grip 48 to open and close the slide tray 46 in the track assembly 44. A key operated lock 52 is in the slide tray 46, to prevent an unauthorized opening of the slide tray 46 and removal of the messages and mail 24 therefrom.

The side door 20 can be fabricated out of the same material and color 54 as the roof 14 of the motor vehicle 12, so as to blend into the decor of the roof 14. The rear side wall 36, the walls 38, the bottom shelf 40, the track assembly 44 and the slide tray 46 are all fabricated out of a durable metal material 56.

OPERATION OF THE INVENTION

To use the message box 10 the following steps should be taken:

1. Make sure that the key operated lock 34 in the side door 20 is locked to prevent the side door 20 from being opened.

2. Make sure that the key operated lock 52 in the slide tray 46 is also locked to prevent the slide tray 46 from being opened.

3. Messages and mail 24 can now be deposited through the narrow slot 22 in the side door 20.

4. The key operated lock 52 in the slide tray 46 can now be opened, so that a person sitting in the drivers seat 16 in the motor vehicle 12 can hold the finger grip 48 and pull the slide tray 46 open into the track assembly 44.

5. A hand of the person can now reach into the compartment 42 and remove the messages and mail 24 from the bottom shelf 40.

6. The key operated lock 34 in the side door 20 can also be opened, so that the side door 20 ca be opened allowing a person outside of the motor vehicle 12 to remove the messages and mail 24 from the bottom shelf 40, without having to enter the motor vehicle 12.

LIST OF REFERENCE NUMBERS 10 message box
12 motor vehicle
14 roof of 12
16 drivers seat in 12
18 small rectangular side aperture
20 side door in 18
22 narrow slot in 20
24 messages and mail
26 receptacle
28 retrieving structure in 26
30 lip seal on 18
32 spring hinge on 20
34 key operated lock in 2
36 rear side wall of 26
38 end wall of 26
40 bottom shelf of 26
42 compartment in 26
44 track assembly
46 slide tray
48 finger grip
50 free end of 46
52 key operated lock in 46
54 same material and color for 20 as 14
56 durable metal material for 36, 38, 40, 44 and 46

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A message box for a motor vehicle having a roof and a drivers seat, which comprises:
    a) the roof having a small rectangular side aperture located near the drivers seat;
    b) a side door in said side aperture of the roof, said side door having a narrow slot to allow messages and mail to be deposited therethrough;
    c) a receptacle mounted to the underside of the roof within the motor vehicle above the drivers seat and adjacent said side door, so as to receive the messages and mail deposited through said narrow slot in said side door; and
    d) means in said receptacle for retrieving the messages and mail deposited therein.

2. A message box as recited in claim 1, further including a lip seal about the perimeter of said side aperture to prevent water from entering past said side door and into said receptacle, so as to keep said receptacle waterproof.

3. A message box as recited in claim 2, wherein said side door includes a pair of spring hinges, each located on an opposite side and adjacent a top edge between said side door and said side aperture in the roof, so that said side door can be lifted up to gain access into said receptacle from the exterior of the motor vehicle.

4. A message box as recited in claim 3, wherein said side door includes a key operated lock to prevent unauthorized entry into said receptacle from the exterior of the motor vehicle.

5. A message box as recited in claim 4, wherein said receptacle includes:
    a) a rear side wall;
    b) a pair of end walls; and
    c) a bottom shelf extending about halfway the length of said rear side wall behind said slot in said side door, so as to form a compartment to receive the messages and mail deposited through said slot.

6. A message box as recited in claim 5, wherein said retrieving means includes:
    a) a track assembly integrally formed under opposite sides of said bottom shelf and extending longitudinally between said end walls of said receptacle; and
    b) a slide tray to fit between said track assembly below said bottom shelf, so that said slide tray can ride within said track assembly and be opened to retrieve the messages and mail deposited onto said bottom shelf within the motor vehicle.

7. A message box as recited in claim 6, wherein said retrieving means further includes a finger grip extending downwardly from a free end of said slide tray, so that a person sitting in the drivers seat in the motor vehicle can hold said finger grip to open and close said slide tray in said track assembly.

8. A message box as recited in claim 7, wherein said retrieving means further includes a key operated lock in said slide tray, to prevent an unauthorized opening of said slide tray and removal of the messages and mail therefrom.

9. A message box as recited in claim 8, wherein said side door can be fabricated out of the same material and color as the roof of the motor vehicle, so as to blend into the decor of the roof.

10. A message box as recited in claim 9, wherein said rear side wall, said end walls, said bottom shelf, said track assembly and said slide tray are all fabricated out of a durable metal material.

* * * * *